United States Patent [19]

Kreuder et al.

[11] 4,022,724

[45] May 10, 1977

[54] NITROCELLULOSE ALKYD RESIN LACQUERS CONTAINING BIS-(HYDROXYPHENYL)-ALKANES

[75] Inventors: Hans Joachim Kreuder; Bernd Peltzer, both of Krefeld; Johannes Beckers, Kempen; Wolfgang Kremer, Krefeld; Theo Kempermann, Cologne, all of Germany

[73] Assignee: Bayer Aktiengesellschaft, Germany

[22] Filed: July 18, 1975

[21] Appl. No.: 597,169

[30] Foreign Application Priority Data

July 24, 1974 Germany .......................... 2435511

[52] U.S. Cl. ............................ 260/16; 260/22 CQ
[51] Int. Cl.² .......................................... C08L 1/18
[58] Field of Search .................... 260/16, 22 CQ

[56] References Cited

UNITED STATES PATENTS

| | | | |
|---|---|---|---|
| 2,068,634 | 1/1937 | Bruson et al. ...................... | 260/16 |
| 2,125,484 | 8/1938 | Bogin ................................. | 260/16 |
| 2,729,571 | 1/1956 | Brandner et al. ................... | 260/16 |
| 2,907,722 | 10/1959 | Staicopoulos ...................... | 260/16 |
| 3,128,260 | 4/1964 | Langstroth ......................... | 260/16 |
| 3,632,837 | 1/1972 | Kolyer et al. ....................... | 260/16 |

Primary Examiner—Edward M. Woodberry
Attorney, Agent, or Firm—Connolly and Hutz

[57] ABSTRACT

Alkyd resin lacquers which contain cellulose nitric acid esters can be prevented from "lifting" and yellowing by the addition of bis-[hydroxyphenyl]-alkanes which are substituted in the nucleus.

3 Claims, No Drawings

NITROCELLULOSE ALKYD RESIN LACQUERS CONTAINING BIS-(HYDROXYPHENYL)-ALKANES

This application relates to lacquers which contain cellulose nitric acid esters and which do not undergo "lifting" and have little tendency to yellowing.

Cellulose nitric acid esters, generally known as nitrocellulose (hereinafter abbreviated to "NC"), NC cotton or collodion have been widely used in the lacquer industry as dehydrating lacquer components because they impart their excellent physical drying properties to combination lacquers in which they are used. It is not possible to use NC as the sole lacquer binder because, when used on its own, it can only give rise to brittle, fragile lacquer films.

For plasticizing NC cotton, oil-free or, preferably oil- or fatty acid-modified alkyd resins are used in addition to the conventional plasticizers, such as phthalates and adipates, because alkyd resins which are oil-modified or contain units of synthetic or natural fatty acids not only impart excellent leveling properties and elasticity to the NC lacquers but also compare favourably with the conventional plasticizers in that they are non-volatile by virtue of their higher molecular weight and they drastically reduce the brittleness which is often observed to develop in the course of ageing of the lacquer films.

The above-mentioned advantages of plasticizing nitrocellulose are offset by the disadvantage that the lacquer filsm undergo "lifting" when over-lacquered with a top coat. This over-lacquering is often necessary to obtain a lacquer film of sufficient thickness or to correct faults in the film. By "lifting" is meant a partial swelling of the lacquer film by the action of the solvent of the new layer of lacquer, with the result that a rough, wrinkly film surface is obtained after drying.

It is known that various phenols, quinones, oximes and amines and particularly highly substituted phenols can to some extent prevent this very troublesome "lifting" of NC combination lacquers, but only at the expense of causing severe yellowing when the lacquer is exposed to heat or weathering (Deutsch FarbenZeitshrift, Volume 10 (1953), 384 et seq). It is known from phenol-formaldehyde resins that compounds which contain phenolic groups increase the yellowing of lacquer films.

It was therefore an object of the present invention to provide NC alkyd resin lacquers which could not only be over-lacquered without undergoing the phenomenon of lifting but also resisted yellowing in the finished lacquer films.

The solution to this problem was made particularly difficult by the high standards which must be met by clear lacquers and white lacquers. Even the faintest trace of yellowing is objectionable.

It has now surprisingly been found that the addition of bis-[hydroxyphenyl]-alkanes which are substituted in the nucleus as represented by the following general formulae:

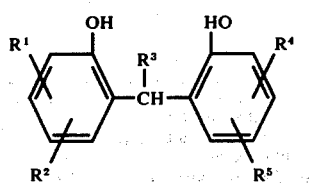

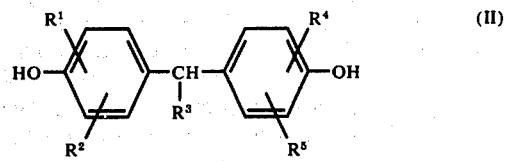

prevent "lifting" without causing yellowing to any significant extent.

In the above formulae, $R^1$, $R^2$, $R^4$ and $R^5$, which may be the same or different, each represent straight- or branched- chain alkyl groups containing from 1 to 6 carbon atoms or they may represent cycloaliphatic groups having from 5 to 7 carbon atoms which may be substituted; and $R^3$ represents a hydrogen atom or one of the substituents mentioned for $R^1$, $R^2$, $R^4$ and $R^5$. The substituents $R^1$, $R^2$, $R^4$ and $R^5$ are preferably in the ortho- and para-positions to the phenolic group in compounds corresponding to formula (I) and in the ortho-position in compounds corresponding to formula (II).

Particularly preferred bis-[hydroxyphenyl]-alkanes are bis-[2-hydroxy-5-methyl-3-cyclohexyl-phenyl]-methane and 1-bis-[2-hydroxy-3,5-dimethyl-phenyl]-isobutane.

This invention relates to non-lifting lacquers containing cellulose nitric acid esters, which lacquers have little tendency to yellowing and have been plasticized by effective quantities of the conventional plasticizers and which, in addition to the said plasticizers, customary solvents and if desired other auxiliary agents, consist of:

A. from 20 to 80%, by weight, of alkyd resins, based on the sum of components (A) and (B) (measured as solids); and B. from 80 to 20% by weight of cellulose nitric acid esters, based on the sum of components (A) and (B) (measured as solids); characterised in that, in addition, they contain, C. from 0.05 to 4% by weight, based on component (A), of bis-[hydroxyphenyl]-alkane corresponding to the general formulae (I) and/or (II), as hereinbefore defined. The substances used as component (A) are most suitably alkyd resins which are modified by units of fatty acids and/or oils. By "alkyd resins" are meant polyesters obtained by the polycondensation of alcohols are carboxylic acids by known methods, as defined, for example, in Rompp's Chemielexikon, Volume 1, page 202, Franckh'sche Verlagsbuchhandlung, Stuttgart 1966, or described by D. H. Solomon, The Chemistry of Organic Filmformers, pages 75 – 101, John Wiley and Sons Inc., New York 1967. The alcohols used generally contain from 1 to 15, preferably from 2 to 6, carbon atoms and the acids or the ester forming derivatives thereof from 2 to 14, preferably from 4 to 12, carbon atoms. If desired these alkyd resins may be mixed with other alkyd resins, for example also oil-free alkyd resins (polyesters).

Examples of suitable alcohols include: pentaerythritol, glycerol, trimethylolpropane, trimethylolethane, butane-1,2,4-triol, hexane-1,2,6-triol, ethyleneglycol, propane-1,2-diol, propane-1,3-diol, butane-1,2-diol, butane-1,3-diol, butane-1,4-diol, neopentylglycol, diethyleneglycol, triethyleneglycol, dipropylene glycol, hexanediols, such as hexane-1,6-diol, polyhydrobisphenols, 1,2-bis-[hydroxymethyl]-cyclohexane, 1,4-bis-[hydroxymethyl]-cyclohexane, 2,2-dimethylpropane -1,3-diol, 2-ethylhexane-1,3-diol, cyclohexane 1,2-diol, cyclohexane-1,4-diol, bis-ethylene glycol adipate, neopentyl glycol hydroxypivalate, benzyl alcohol, cyclohexanol and other monohydric alcohols containing from 1 to 6 carbon atoms. The preferred alcohols are glycerol, trimethylol propane and pentaerythritol.

The following carboxylic acids and ester forming derivatives thereof are mentioned as examples of suitable acid components: phthalic acid, isophthalic acid, terephthalic acid, tetra- and hexa-hydrophthalic acid, endomethylene tetrahydrophthalic acid, succinic acid, adipic acid and sebacic acid; trimellitic acid; benzoic acid and derivatives, thereof e.g. p-tert.-butylbenzoic acid and hexahydrobenzoic acid. The most commonly used acid component is phthalic acid. For example, tetrachloro- and tetrabromo-phthalic acid or hexachloroendomethylene tetrahydrophthalic acid (HET acid) may be used to produce flame resistant resins although flame resistance may also be obtained by the addition of halogenated compounds which are not incorporated by condensation, for example a chloroparaffin.

The proportion of oil in the alkyd resins used for the lacquers according to the invention is preferably from 5 to 65% by weight, more preferably from 25 to 50% by weight, calculated as triglyceride and based on the quantity of alkyd resin. The drying or non-drying fatty acids, which generally contain from 6 to 24 carbon atoms, may be used either as such or in the form of their glyceric esters (triglycerides). Vegetable and animal oils, fats or fatty acids are suitable for this purpose, for example coconut oil, ground nut oil, castor oil, olive oil, soya bean oil, linseed oil, cotton seed oil, safflower oil or the fatty acids of these oils, dehydrated castor oil or fatty acid, singly unsaturated, conjugated and isomerised unsaturated fatty acids, lard, tallow, train oils, tall oil fatty acid and snythetic fatty acids.

The acid number of the alkyd resins of component (A) should preferably be between 0 and 50 and more preferably between 5 and 30, the OH numbers preferably between 10 and 250, more preferably between 30 and 150 and the molecular weights preferably between 500 and 10,000, more preferably between 1,000 and 3,000, (the molecular weight being determined as the numerical average by the vapour pressure osmometric method using acetone and dioxane as solvents; if both values differ from each other, the lower value is considered to be the more accurate one).

The usual qualities of collodion cotton, i.e. cellulose nitric acid esters with a nitrogen content of from 10.6 to 12.4% by weight may be used as component (B) for the lacquer binders according to the invention.

Component (C) may be added to the solution of th alkyd resins. Alternatively, it may be added before or during preparation of the alkyd resin or it may be added to the other lacquer components at any stage of preparation or to the finished lacquer.

Examples of the conventional plasticizers which may be added in quantities of up to 50% by weight, preferably from 5 to 30% by weight, based on the sum of components (A) to (C), include esters, such as dibutyl adipate, benzyl butyl adipate, benzyl octyl adipate, dioctyl phthalate and dicyclohexylphthalate, phosphoric acid esters, such as tricresyl phospate, triphenylphosphate or trioctylphosphate, or also particular plasticizers, such as benzene sulphonic acid-N-methylamide or castor oil and/or its derivatives.

The lacquers according to the invention may contain an amount twice to nine times as large (by weight) as the sum of components (A) and (B), of the conventional organic solvents used in lacquer technology, for example benzene and its derivatives substituted with from 1 to 3 alkyl groups each of which may contain from 1 to 4 carbon atoms, e.g. toluene, xylene or cumene; saturated aliphatic monohydric alcohols and diols containing from 2 to 8 carbon atoms, e.g. ethanol, isopropanol, n-butanol, ethylene glycol or propane-1,2-diol; monocarboxylic acid alkyl esters containing from 1 to 6 carbon atoms in the alkyl group, e.g. ethyl acetate and butyl acetate; mono-ethers of the above-mentioned saturated aliphatic diols obtained by etherification of these diols with alkanols which contain from 1 to 6 carbon atoms, e.g. ethylene glycol monoethylether and ethylene glycol monobutylether; esters obtained from these ether alcohols by esterification with saturated aliphatic mono-carboxylic acids containing from 2 to 6 carbon atoms, e.g. ethylene glycol monobutylether acetate; and also mixtures of these solvents.

The lacquers may be pigmented by the conventional methods of addition of pigments, such as titanium dioxide, carbon black, talcum, barium sulphate, zinc sulphate, strontium chromate, barium chromate, molybdenum red, iron yellow, iron red, iron black, hydrated iron oxide or pigments, such as cadmium yellow or cadmium red, as well as organic pigments and dyes. Substances, such as heavy spar, quartz powder, kaolin microtalcum and micro corn blende, may be used as fillers.

Auxiliary agents and additives, such as levelling agents, matting agents, anti-settling agents, defoaming agents and other auxiliary agents and additives commonly used in lacquer technology may also be added to the lacquers according to the invention.

EXAMPLES

The percentages given below are percentages by weight.

Preparation of an alkyd resin solution (I):

383 parts, by weight, of ground nut oil fatty acid, 247 parts, by weight, of glycerol and 370 parts, by weight, of phthalic acid anhydride are heated to 200° C in a melt condensation apparatus in the course of 10 hours while a stream of nitrogen is passed through and the water formed by the reaction is continuously removed. The reaction mixture is maintained at this temperature until an acid number of about 15 [mg of KOH/g of substance] and a viscosity corresponding to outflow time of from 55 to 65 seconds determined on a 50% solution in xylene according to DIN 53 211 (DIN No. 4 cup) are obtained. The alkyd resin prepared in this way is dissolved in xylene to form a 60% solution.

The alkyd resin can be prepared equally successfully by the azeotropic esterification process, e.g. using xylene as carrier agent.

EXAMPLE 1

Preparation of a clear lacquer:

A lacquer of the following composition was prepared:

| | |
|---|---|
| Alkyd resin (I), 60% in xylene | 227 parts, by weight |
| Collodion cotton Standard type 24 E (DIN 53 179) moistened with 65% butanol (cellulose nitric acid ester containing approximately 12% of nitrogen) | 111 " " |

-continued

| | | |
|---|---|---|
| Dibutylphthalate | 2 | " " |
| Ethyl acetate | 187 | " " |
| Butyl acetate | 135 | " " |
| Methyl isobutyl ketone | 5 | " " |
| Toluene | 120 | parts, by weight |
| Xylene | 120 | " " |
| Ethylene glycol monoethylether | 3 | " " |

The resulting lacquer has a viscosity corresponding to an outflow time of about 40 seconds, determined according to DIN 53 211 (DIN No. 4 cup). The quantities of component (C) indicated in the Table were added by stirring them into the finished lacquer.

Table 1

| Quantity of Component (C) in finished lacquer | Drying until free from tackiness | Pendulum hardness, according to Albert-Konig*, after 1 hour | UV yellowing after 16 hours' exposure to high pressure mercury vapour radiator HTQ 4**, distance 40 cm | Response to over-lacquering after storage at 50° C (resistance to lifting) |
|---|---|---|---|---|
| — | 15 min | 55–60 sec. | slight yellowing | lifting after 1 day |
| 0.05%¹ | 15 " | 55–60 " | slight yellowing | no lifting after 26 days |
| 0.05%² | 15 " | 55–60 " | slight yellowing | no lifting after 26 days |
| 0.2 %³ | 20 " | 50–55 " | very strong yellowing | lifting after 9 days |
| 1.5 %⁴ | 20 " | 55–60 " | strong yellowing | lifting after 26 days |

All tests were carried out on a layer with a thickness of 30 ± 5 μ
¹ 1-Bis-[2-hydroxy-3,5-dimethyl-phenyl]-isobutane
²Bis-[2-hydroxy-5-methyl-3-cyclohexyl-phenyl]-methane
³o-cyclohexylphenol
⁴tert.-butylphenol-formaldehyde condensation resin containing 4.5% of free hydroxyl groups
*determined according to DIN 53 157
**Philips 40 W/cm high pressure radiator

EXAMPLE 2

Preparation of a pigmented lacquer:

| | | |
|---|---|---|
| Alkyd resin solution (I), 60 % in xylene | 172 parts, by weight | |
| Collodion cotton Standard type 24 E (DIN 53 179) moistened with 65% butanol (cellulose nitric acid ester containing approximately 12 % of nitrogen) | 78 | " " |
| Dibutyl phthalate | 15 | " " |
| Titanium dioxide | 136 | " " |
| Ethyl acetate | 154 | " " |
| Butyl acetate | 102 | " " |
| Toluene | 132 | " " |
| Xylene | 133 | " " |
| Methyl isobutyl ketone | 78 | " " |

The titanium dioxide pigment was dispersed by triturating it with the alkyd resin solution in a three roll mill. The resulting lacquer was found to have a viscosity corresponding to an outflow time of 35 seconds, determined according to DIN 53 211 (DIN No. 4 cup). Components (C) were added to the finished lacquer.

We claim:
1. A non-lifting lacquer containing
   A. from 20 to 80% by weight of an alkyd resin;
   B. from 80 to 20% by weight of a cellulose nitric acid ester, said % by weights of (A) and (B) being based on the sum of the weights of (A) and (B) in said non-lifting lacquer and
   C. from 0.05 to 4% by weight, based on the weight of component (A), of at least one compound selected from the group consisting of

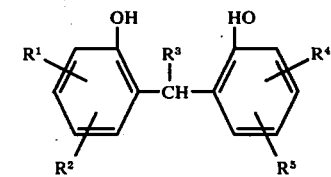

and

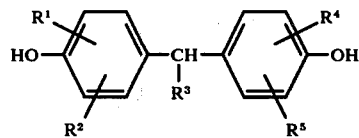

wherein R¹, R², R⁴ and R⁵ are the same or different and are each alkyl having 1 to 6 carbon atoms or an optionally substituted cycloaliphatic radial having 5 to 7 carbon atoms and R³ is alkyl having 1 to 6 carbon atoms, an optionally substituted cycloaliphatic radical having 5 to 7 carbon atoms or hydrogen.

2. The non-lifting lacquer of claim 1 wherein (C) is bis-[2-hydroxy-5-methyl-3-cyclohexylphenyl)methane.

3. The non-lifting lacquer of claim 1 wherein (C) is 1-bis-(2-hydroxy-3,5-dimethylphenyl)isobutane.

\* \* \* \* \*

Table 2

| Quantity component (C) in finished lacquer | Drying until free from tackiness | Pendulum hardness, according to Albert-Koning*, after 1 hour | UV yellowing after 16 hours' exposure to mercury high pressure radiator HTQ 4** distance 40 cm | Response to over-lacquering after storage at 50° C (resistance to lifting) |
|---|---|---|---|---|
| — | 12 min. | 65–70 sec. | slight yellowing | lifts after 1 day |
| 0.05%¹ | 12 " | 65–70 " | slight yellowing | no lifting after 26 days |
| 0.05%² | 12 " | 65–70 " | slight yellowing | no lifting after 26 days |
| 0.2 %³ | 15 " | 60–65 " | very strong yellowing | lifts after 9 days |
| 1.5 %⁴ | 15 " | 65–70 " | strong yellowing | lifts after 26 days |

All tests were carried out on a dry layer with a thickness of 30 ± 5 μ
¹1-Bis-[2-hydroxy-3,5-dimethyl-phenyl]-isobutane
²Bis-[2-hydroxy-5-methyl-3-cyclohexyl-phenyl]-methane
³o-cyclohexylphenol
⁴condensation of resin of tert.-butylphenol and formaldehyde with a free hydroxyl group content of 4.5%
*determined according to DIN 53 157
**Philips 40 W/cm high pessure radiator